United States Patent
Park et al.

(10) Patent No.: US 7,126,573 B2
(45) Date of Patent: Oct. 24, 2006

(54) METHOD AND APPARATUS FOR DRIVING LIQUID CRYSTAL DISPLAY

(75) Inventors: Jong Jin Park, Seoul (KR); Hyeon Ho Son, Ahnyang-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 339 days.

(21) Appl. No.: 10/607,983

(22) Filed: Jun. 30, 2003

(65) Prior Publication Data

US 2004/0032385 A1 Feb. 19, 2004

(30) Foreign Application Priority Data

Aug. 8, 2002 (KR) ............... 10-2002-0046855

(51) Int. Cl.
*G09G 3/36* (2006.01)
*G09G 5/00* (2006.01)

(52) U.S. Cl. ............... 345/94; 345/87; 345/208

(58) Field of Classification Search ............... 345/53, 345/87–101, 204, 691–693
See application file for complete search history.

(56) References Cited

U.S. PATENT DOCUMENTS 6,057,817 A * 5/2000 Ono et al. ............... 345/94
6,222,605 B1 * 4/2001 Tillin et al. ............... 349/167
6,509,887 B1 * 1/2003 Kondoh et al. ............... 345/87
2002/0015017 A1 * 2/2002 Kwag ............... 345/89

FOREIGN PATENT DOCUMENTS

EP 1043618 A1 * 10/2000

* cited by examiner

*Primary Examiner*—Richard Hjerpe
*Assistant Examiner*—Stephen Sherman
(74) *Attorney, Agent, or Firm*—McKenna Long & Aldridge LLP

(57) ABSTRACT

A liquid crystal display and method that prevents transition of liquid crystals from a bend state to a splay state caused by an external impact by keeping an average pixel voltage above transition voltage Vtr when driven. The liquid crystal display includes a thin film transistor at each intersection part of a plurality of data lines and a plurality of gate lines; a gate driver for supplying a gate high voltage and a gate low voltage during a data input period, and sequentially supply a gate reset voltage to gate lines during a reset period a data driver for supplying data voltages to the data lines in accordance with gate voltages applied to the gate lines; and a timing controller for controlling the data voltages supplied to the data lines and the gate voltages supplied to the gate lines.

15 Claims, 15 Drawing Sheets

SPLAY → BEND

METHOD AND APPARATUS FOR DRIVING LIQUID CRYSTAL DISPLAY

This application claims the benefit of the Korean Patent Application No. 2002-46855 filed on Aug. 8, 2002, which is hereby incorporated by reference for all purposes as if fully set forth herein.

BACKGROUND OF THE INVENTION

1. Field of the Invention

The present invention relates to a liquid crystal display, and more particularly to a liquid crystal display that is adaptive for preventing transition of liquid crystals from a bend state to a splay state caused by an external impact when using a data voltage lower than a transition voltage Vtr while actually driven, and a driving method thereof.

2. Discussion of the Related Art

Generally, liquid crystal displays control the light transmittance of liquid crystal cells in accordance with video signals to display a picture. An active matrix liquid crystal display provided with a switching device by liquid crystal cells is suitable for displaying a motion picture. A thin film transistor (hereinafter, referred to as TFT) is mainly used as a switching device in the active matrix liquid crystal display. Because such a liquid crystal display can be made into a smaller device in size than the existing cathode ray tube, it has been widely used for office automation equipment such as a copy machine, etc. and portable equipment such as a cellular phone, a pager etc., as well as a personal computer and a notebook computer.

As shown in FIG. 1, the related art liquid crystal display includes a liquid crystal display panel 2 having liquid crystal cells arranged in a matrix, a gate driver 4 to drive gate lines GL0 to GLn of the liquid crystal display panel 2, a data driver 6 to drive data lines DL1 to DLm of the liquid crystal display panel 2, and a timing controller 8 to control the gate driver 4 and the data driver 6.

The liquid crystal display panel 2 includes liquid crystal cells arranged in a matrix and a TFT formed at each intersection area of an n+1 number of gate lines GL0 to GLn and an m number of data lines DL1 to DLm.

The timing controller 8 controls gate voltages applied to the gate lines GL0 to GLn and data voltages applied to the data lines Dl1 to DLm. The timing controller 8 generates dot clocks (DCLK) and gate start pulses (GSP) in use of horizontal/vertical synchronization signals H, V input from a video card (not shown), thereby controlling the data driver 6 and the gate driver 4. Herein, the dot clocks DCLK are applied to the data driver 6 and gate start pulses GSP are applied to the gate driver 4.

The gate driver 4 includes a shift register to sequentially generate scan pulses in response to the gate start pulse (GSP) input from the timing controller 8, and a level shifter to shift a voltage of the scan pulse to a voltage level suitable for driving the liquid crystal cell. The gate driver 4, as shown in FIG. 2, is supplied with a gate shift clock signal (GSC) having one horizontal period. The gate driver 4, if the gate start pulse (GSP) is applied from the timing controller 8, performs a shifting operation in response to the gate shift clock (GSC). Scan pulses (SP) of one horizontal period, 1H, are sequentially applied to the gate lines GL1 to GLn. The TFT is turned on in response to the scan pulse SP for video data to be charged in the pixel electrode of the liquid crystal cell.

The data driver 6 receives the dot clock (DCLK) from the timing controller 8, together with red R, green G and blue B digital video data. The data driver 6 latches the red R, green G and blue B digital video data in synchronization with the dot clock (DCLK), corrects the latched data in accordance with a gamma voltage Vγ, converts the corrected data into analog data, and then supplies the converted data to the data line DL by lines. Specifically, the data driver 6 converts the corrected data into analog data signal in use of a negative or positive gamma voltage in response to a polarity inversion signal, thereby determining the polarity of the data voltage Vd applied to the data lines DL1 to DLm.

Referring to FIG. 3, a unit pixel of the liquid crystal display includes a TFT formed at an intersection part of the gate line GL and the data line DL, a storage capacitor Cst connected to the previous gate line Gn−1, and a liquid crystal cell Clc connected to the TFT, the storage capacitor Cst and a common voltage source Vcom of an upper plate (not shown).

The TFT supplies data voltages Vd from the data lines DL1 to DLm to the liquid crystal cell Clc in response to the gate high voltage Vgh from the gate lines GL1 to GLn. The liquid crystal cell Clc may be equally indicated as a liquid cell capacitor Clc including a pixel electrode connected to the TFT and the common electrode Vcom that faces the liquid crystal cell Clc with liquid crystals therebetween.

Within the liquid crystal cell, the storage capacitor Cst is formed to sustain the data voltage Vd charged in the liquid crystal cell capacitor Clc until the next data voltage Vd is charged, i.e., while a gate low voltage Vgl is applied. The storage capacitor Cst is formed between the previous gate line and the pixel electrode. Such a liquid crystal cell controls light transmittance by having the liquid crystals with dielectric constant anisotropy changed in an arrangement state in accordance with the data voltage Vd charged through the TFT, thereby implementing gray levels.

In FIG. 4, gate high voltage (Vgh) and gate low voltages (Vgl) are supplied to the gate lines GL1 to GLn. The gate lines GL1 to GLn are supplied with the gate high voltage Vgh for a corresponding horizontal period 1H, and with the gate low voltage Vgl for the remaining period. The gate low voltage Vgl is applied to the gate line formed on the uppermost side for the storage capacitor Cst of the first gate line GL. Scan pulses (SP) with the gate high voltage Vgh turn on the TFT switch, and the liquid crystal cell is charged with video data supplied from the data driver 6 while the TFT is turned on. As the gate high voltage Vgh supplied to the gate lines GL1 to GLn is changed to the gate low voltage Vgl, the TFT is turned off, and the storage capacitor Cst causes the voltage $V_{LC}$ of the liquid crystal cell to be dropped by as much as a feed-through voltage $\Delta V_p$ at that time. The feed-through voltage is defined as in Formula 1.

$$\Delta V_p = C_{gs}(V_{gh} - V_{gl})/(C_{gs} + C_{st} + C_{LC})$$ [Formula 1]

Herein, $\Delta V_p$ represents the amount of change of the voltage applied to a liquid crystal cell, Cgs represents a capacitor between a gate electrode G and a source electrode S. Further, Cst represents a storage capacitor, CLc represents a capacitor of the liquid crystal cell, Vgh represents a gate high voltage, and Vgl represents a gate low voltage.

The polarity of a voltage is applied to the liquid crystal cell for each frame. Herein, the voltage applied to the liquid crystal cell is decreased by as much as the feed-through voltage $\Delta V_p$ in the positive frame, and the voltage applied to the liquid crystal cell is increased by as much as the feed-through voltage $\Delta V_p$ in the negative frame. The amount of change of the voltage applied to the liquid crystal cell by the feed-through voltage $\Delta V_p$ is shown as in FIG. 4.

A twisted nematic (TN) mode is generally used in liquid crystals for driving such a liquid crystal display. The liquid crystal cell of TN mode, where a twisted angle of liquid crystal alignment is 90°, changes an alignment state of the liquid crystals in accordance with an application of an electric field, to transmit light. However, using the TN mode for liquid crystals has the problems of a narrow viewing angle and a slow response speed.

To overcome these disadvantages of the TN mode, it has been suggested that liquid crystals can be used with an in-plane switch (IPS) mode or an optically compensated bend (OCB) mode. The OCB mode of the above-mentioned modes has a wider viewing angle and a faster response speed than the TN mode.

Referring to. FIG. 5 and FIG. 6, the LCD panel of an OCB mode includes an upper substrate 10 sequentially provided with a color filter array (not shown) and an alignment film (not shown); a lower substrate 12 provided with a TFT array (not shown) and an alignment film (not shown); a liquid crystal 18 injected into a designated gap between the upper substrate 10 and the lower substrate 12 defined by a spacer (not shown); upper and lower polarizers 14 and 22 arranged respectively on the outsides of the upper and lower substrates 10 and 12; an upper compensating film 16 arranged between the upper substrate 10 and the upper polarizer 14; and a compensating film 20 arranged between the lower substrate 12 and the lower polarizer 22 to compensate a phase of an incident light for increasing a viewing angle.

The alignment films of the upper substrate 10 and the lower substrate 12 are subjected to an alignment treatment in the same direction. The liquid crystal 18 between the upper substrate 10 and the lower substrate 12 maintains a splay state, which is an initial alignment state in accordance with an alignment treatment direction of the alignment film when the voltage of an electric field between the upper and lower substrate is less than a specified voltage Vtr. In other words, the liquid crystal molecules are arranged at tilt angles of $\theta°$ and $-\theta°$ at the surfaces of the upper and lower alignment films, respectively. The tilt angles of the liquid crystal molecules decrease towards the center of the liquid crystal cell such that liquid crystal molecules at the center have an angle of 0°. The liquid crystal molecules having such a splay state are changed into a bend state at a voltage more than the specified voltage Vtr. The time required for changing the liquid crystal molecules from the splay state into a bend state is referred to as "transition time".

The tilt angles of the liquid crystal molecules at the surfaces of the upper and lower alignment films when in the bend state are $\pm\theta$, wherein $\theta$ is usually about 5°~15°. However, the tilt angles of the liquid crystal molecules increase towards the center of the liquid crystal cell such that liquid crystal molecules at the center have an angle of 90°.

FIG. 7 is a diagram representing light transmittance in accordance with a voltage of an OCB mode liquid crystal cell.

Referring to FIG. 7, liquid crystal molecules in the bend state have a characteristic in which light transmittance linearly decreases as the voltage of the electric field increases between the upper and lower substrates. Therefore, the liquid crystal molecules having a bend state are suitable for implementing a gray scale and thus for realizing a picture in an LCD panel.

However, the liquid crystals in the splay state irregularly transmit light at a voltage less than the transition voltage Vtr, and cause stains or flickers to appear in the LCD panel for a short time. Accordingly, the liquid crystal display, using the OCB mode, has a higher voltage than the transition voltage Vtr to change from the splay state into the bend state.

In this way, the OCB mode liquid crystal cell has the liquid crystal changed from the splay state into the bend state at a higher voltage than the transition voltage Vtr in the initial stage, thereby being stabilized.

However, in a case in which an external impact is applied to the liquid crystal cell while actually driven, a pixel voltage at the liquid crystal cell is less than the transition voltage Vtr, so the liquid crystals in the bend state are changed into the splay state to become unstabilized. Therefore, stains and flickers, which occur when liquid crystals are in the splay state, appear on the LCD panel while actually driven.

SUMMARY OF THE INVENTION

Accordingly, the present invention is directed to a method and apparatus for driving a liquid crystal display that substantially obviates one or more of the problems due to limitations and disadvantages of the related out.

An advantage of the present invention is to provide a liquid crystal display that is adaptive for preventing transition of liquid crystals from a bend state to a splay state during an external impact, by way of supplying a gate reset voltage during a reset period, when using a data voltage lower than a transition voltage Vtr while actually driven, and a driving method thereof.

Another advantage of the present invention is to provide a gate driver arranged to supply a gate high voltage to the gate lines for a TFT's turn-on period in a data input period, and supply a gate low voltage to the gate lines for a TFT's turned-off period.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display having a normal drive period when liquid crystals are normally driven after alignment of the liquid crystals injected between upper/lower plates is changed from splay state to a bend state at a voltage higher than a transition voltage. The liquid crystal display includes a liquid crystal display panel having a thin film transistor at each intersection part of a plurality of data lines and a plurality of gate lines; a gate driver configured to supply a gate high voltage and a gate low voltage during a data input period, and sequentially supply the gate reset voltage to gate lines during a reset period, wherein the normal drive period is divided into the data input period and the reset period; a data driver configured to supply data voltages to the data lines in accordance with gate voltages applied to the gate lines; and a timing controller configured to control the data voltages supplied to the data lines and the gate voltages supplied to the gate lines.

In another aspect of the present invention, a driving method of a liquid crystal display having a normal drive period when liquid crystals are normally driven after alignment of the liquid crystals injected between upper/lower plates is changed from a splay state to a bend state at a voltage higher than a transition voltage, the method includes forming a thin film transistor at each intersection part of a plurality of data lines and a plurality of gate lines; dividing the normal drive period into a data input period and a reset period; supplying a gate high voltage and a gate low voltage to the gate lines for the data input period; supplying a gate reset voltage sequentially to the gate lines to make an average voltage of liquid crystal cells higher than the transition voltage for the reset period; and supplying a data reset voltage to the data lines in accordance with the gate reset voltage.

It is understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in a constitute a part of this specification, illustrate embodiments of the invention and together with the description serve to explain the principles of the invention.

In the drawings.

DETAILED DESCRIPTION OF THE ILLUSTRATED EMBODIMENT

Reference will now be made in detail to an embodiment of the present invention, examples of which are illustrated in the accompanying drawings.

Figure 1:
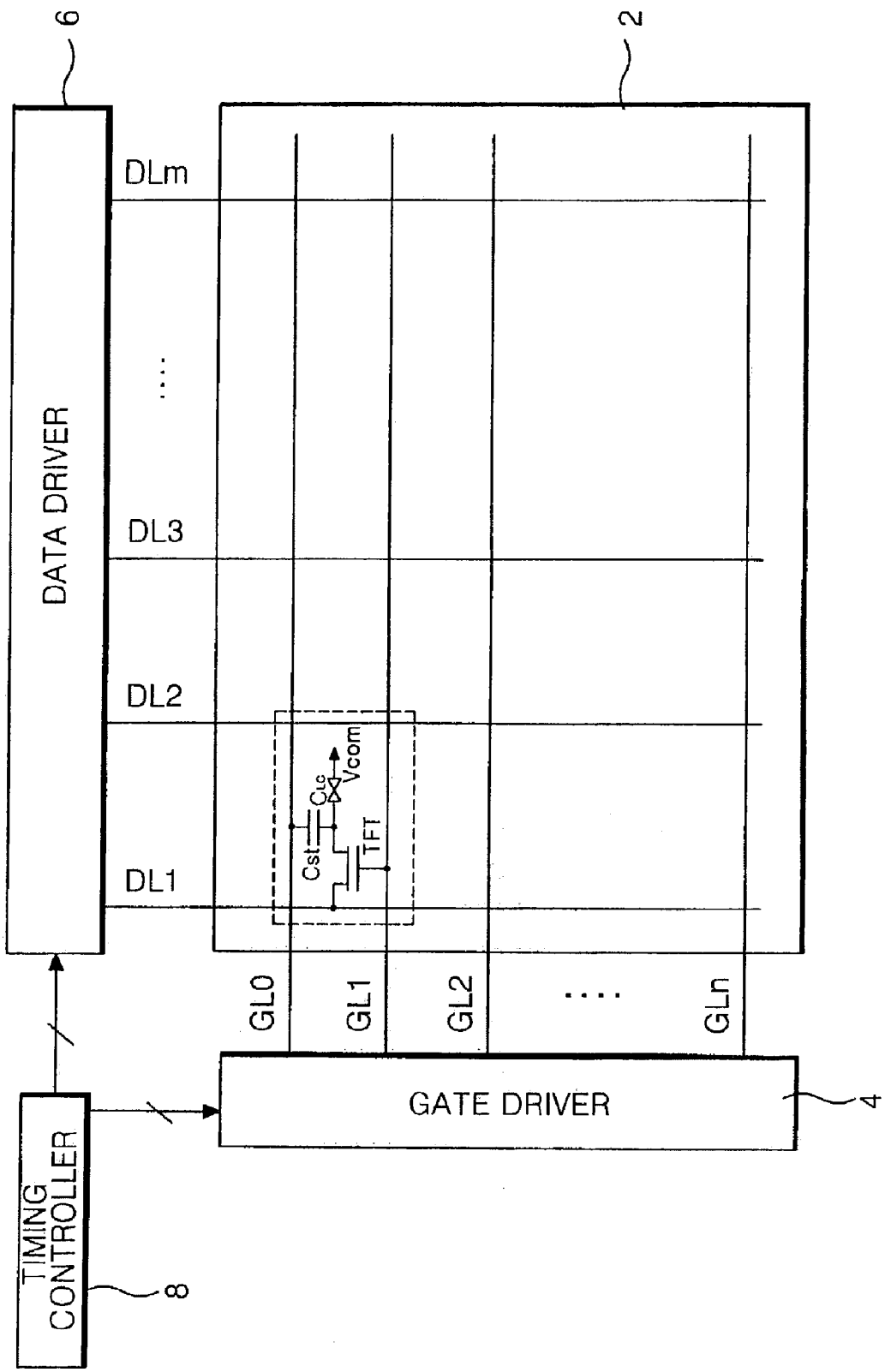
FIG. 1 is a diagram representing a liquid crystal display of the related art.
Figure 2:
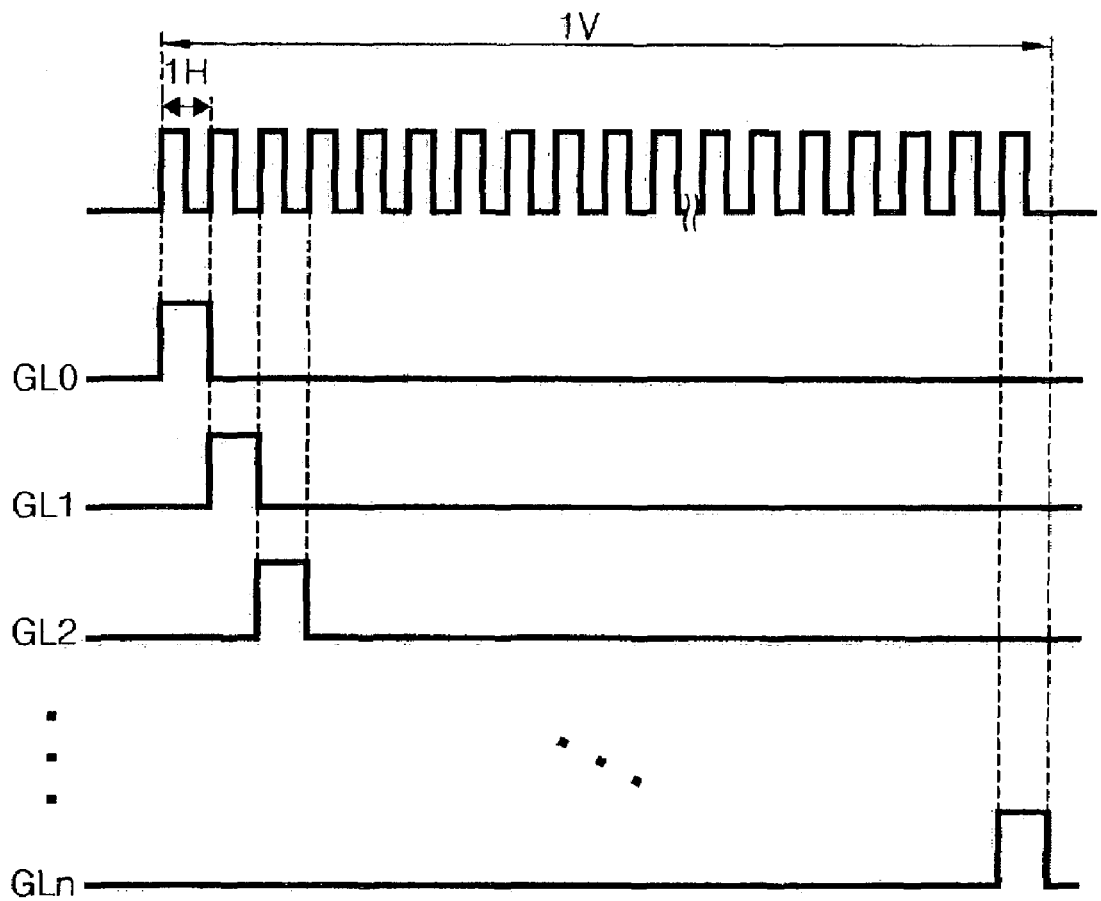
FIG. 2 is a waveform diagram of a scan pulse supplied to gate lines shown in FIG. 1.
Figure 3:
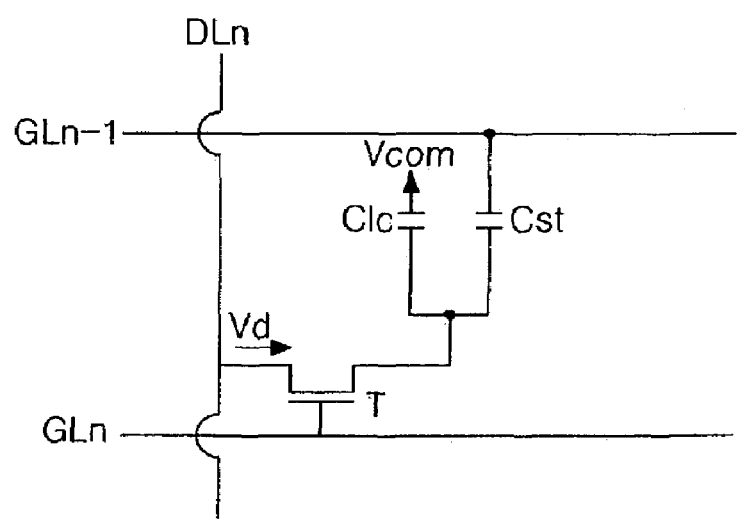
FIG. 3 is an equivalent circuit diagram of a liquid crystal cell shown in FIG. 1.
Figure 4:
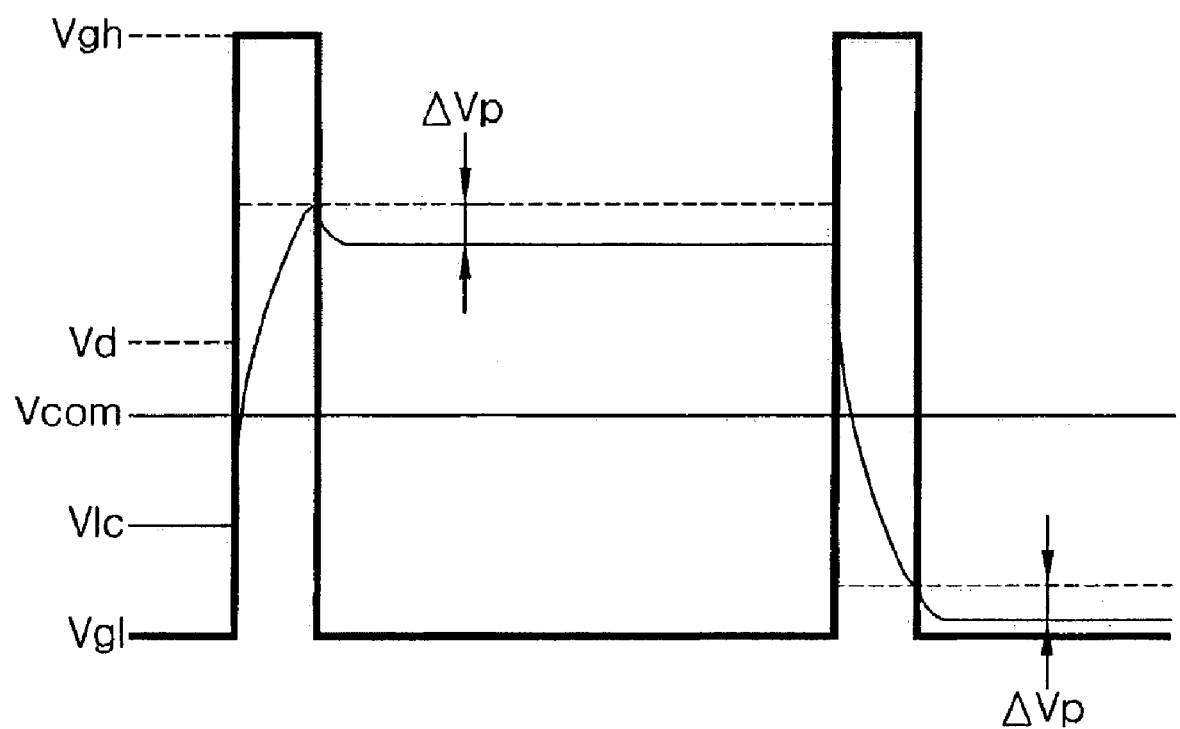
FIG. 4 is a waveform diagram representing a voltage applied to the liquid crystal display cell shown in FIG. 1.
Figure 5:
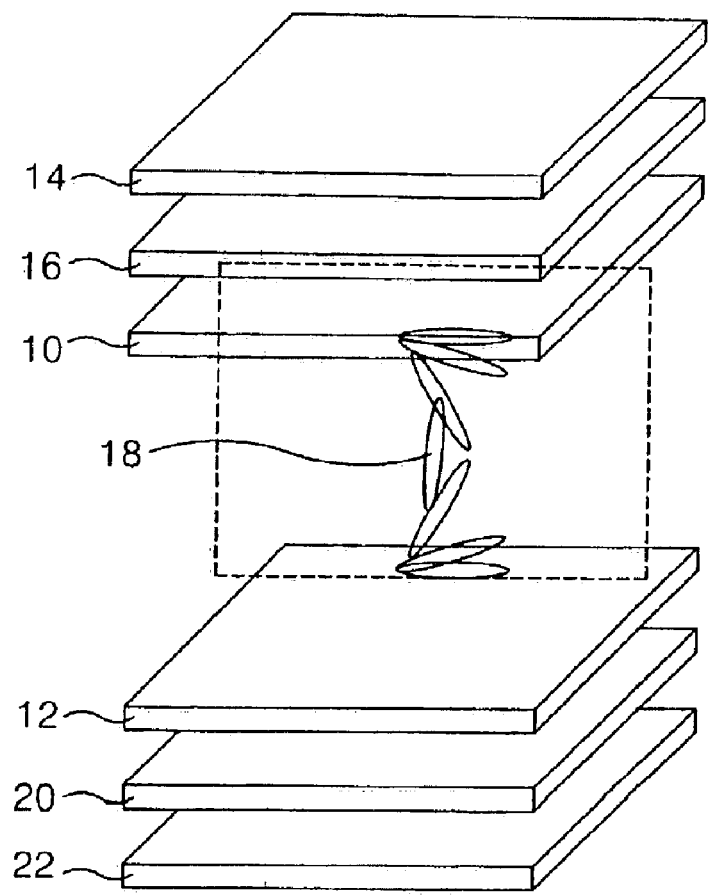
FIG. 5 is a diagram representing a liquid crystal display panel shown in FIG. 1.
Figure 6:
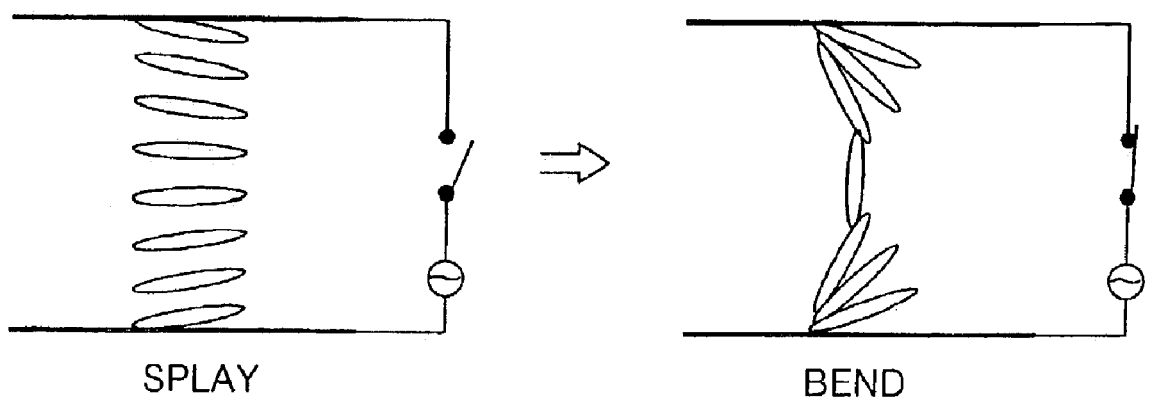
FIG. 6 is a diagram representing the liquid crystal arrangement of an optically compensated bend (OCB) mode liquid crystal cell in accordance with an electric field applied to the liquid crystal cell shown in FIG. 5.
Figure 7:
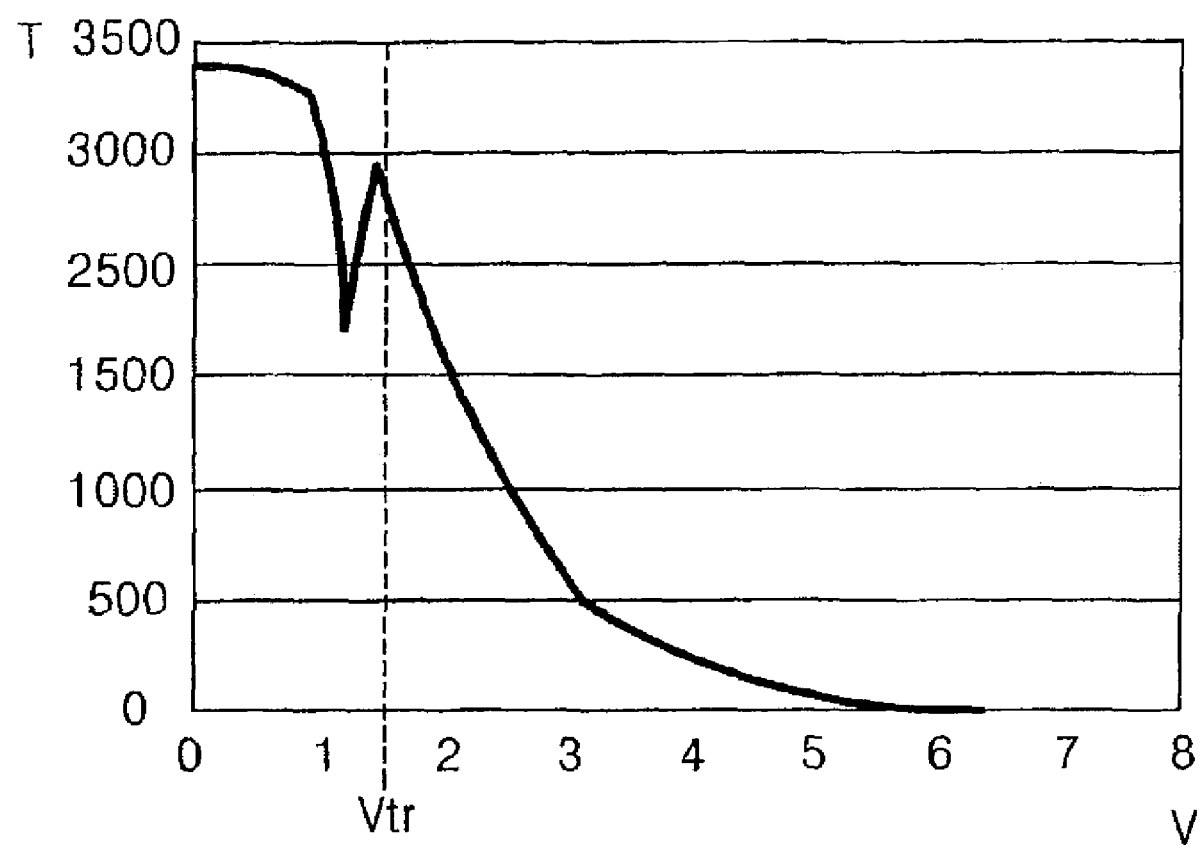
FIG. 7 is a graph representing a plot of transmittance versus electric field in which the electric field is applied to the OCB mode liquid crystal cell shown in FIG. 6.
Figure 8:
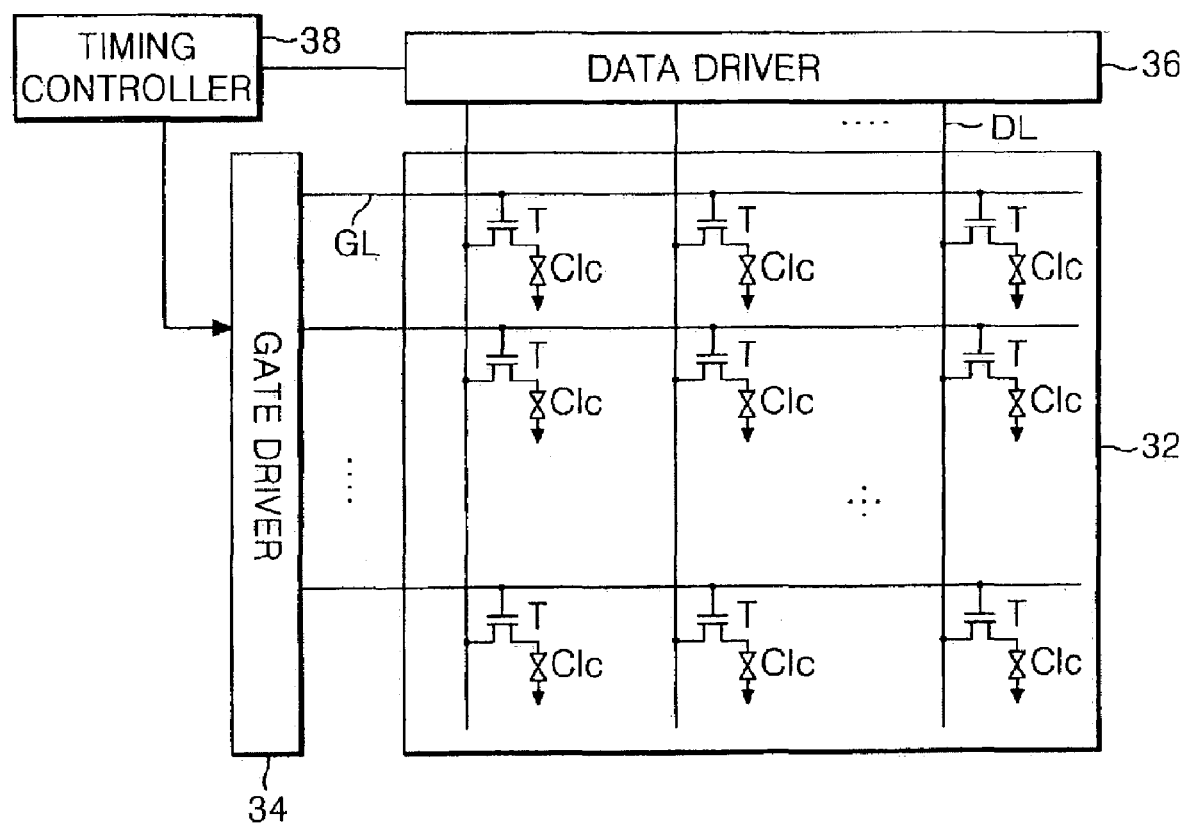
FIG. 8 is a diagram representing a liquid crystal display according to an embodiment of the present invention.

FIG. 8 is a diagram representing a liquid crystal display according to an embodiment of the present invention.

In FIG. 8, the liquid crystal display according to a first embodiment of the present invention includes a liquid crystal display panel 32 having liquid crystal cells Clc arranged in a matrix, a gate driver 34 to drive gate lines GL of the liquid crystal display panel 32, a data driver 36 to drive data lines DL of the liquid crystal display panel 32, and a timing controller 38 to control gate voltages applied to the gate lines GL and converted into gate reset voltages Vrst during a reset period Trst.

Liquid crystal display panel 32 includes liquid crystal cells Clc arranged in a matrix and a TFT T formed at each crossing area of the gate lines GL and the data lines DL. The TFT T charges the liquid crystal cell Clc with data signals from the data line DL in response to gate high voltages Vgh from the gate lines GL. The liquid crystal cell Clc may be equally indicated as a liquid cell capacitor Clc including a pixel electrode connected to the TFT T and the common electrode Vcom that faces the liquid crystal cell Clc with liquid crystals therebetween. Within the liquid crystal cell, the storage capacitor Cst is formed to sustain the data voltage Vd charged in the liquid crystal cell capacitor Clc until the next data voltage Vd is charged, i.e., while a gate low voltage Vgl is applied and, in addition, for being supplied with a reset voltage Vrst lower than the gate low voltage Vgl. The storage capacitor Cst is formed between the previous gate line and the pixel electrode. Such a liquid crystal cell controls light transmittance by having the liquid crystals with dielectric constant anisotropy changed in an arrangement state in accordance with the data signal charged through the TFT, T thereby implementing gray levels.

The timing controller 38 controls gate voltages applied to the gate lines GL0 to GLn and data voltages applied to the data lines Dl1 to DLm. The timing controller 38 generates dot clocks DCLK and gate start pulses GSP in use of horizontal/vertical synchronization signals H, V input from a video card (not shown), thereby controlling the data driver 36 and the gate driver 34. Further, the timing controller 38 controls the timing of a reset period during which the gate reset voltage Vrst is generated.

The gate driver 34 sequentially generates scan pulses in response to gate start pulses GSP input from the timing controller 38 to supply the generated scan pulse to the gate lines. The gate driver 34 is supplied with a gate shift clock signal GSC having one horizontal period 1H. The gate driver 34, if the gate start pulse GSP is applied, performs a shifting operation in response to the gate shift clock GSC. Scan pulses SP of one horizontal period 1H are sequentially applied to the gate lines GL. The TFT is turned on in response to the scan pulse SP for video data to be charged in the pixel electrode of the liquid crystal cell. The gate high voltage Vgh of the scan pulse SP may be about 20V, and the gate low voltage Vgl may be about −5V.

In this way, the gate reset voltage Vrst is applied to the gate lines for the reset period Trst. The gate lines are supplied with three-level voltages, i.e., gate high voltage Vgh, gate low voltage Vgl and gate reset voltage Vrst.

The data driver 36 receives the dot clock DCLK from the timing controller 38 together with red R, green G and blue B digital video data. The data driver 36 latches the red R, green G and blue B digital video data in synchronization with the dot clock DCLK, corrects the latched data in accordance with a gamma voltage Vγ, converts the corrected data into analog data, and then supplies the converted data to the data line DL. The data driver 36 supplies data reset voltages V0 to the data lines as the gate reset voltage Vrst is applied to the gate lines during the reset period Trst.

Figure 9A:
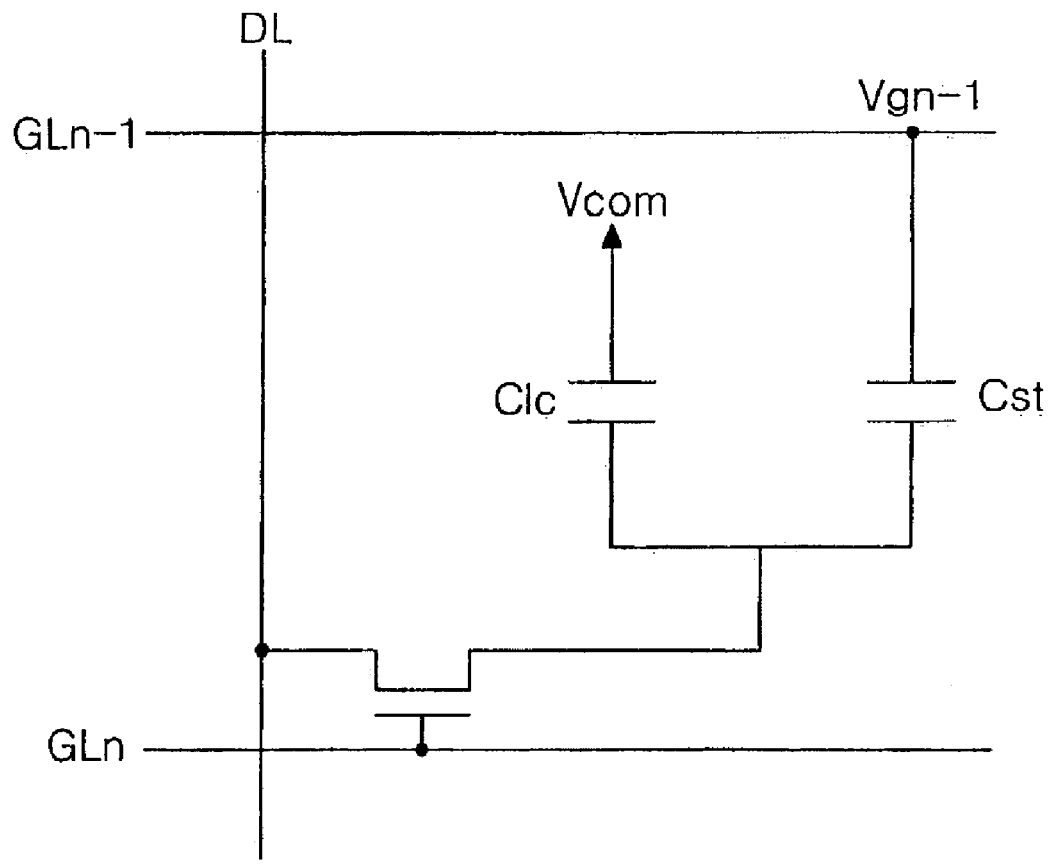
FIG. 9A is an equivalent circuit diagram of a pixel cell of a liquid crystal display panel shown in FIG. 8.
Figure 9B:
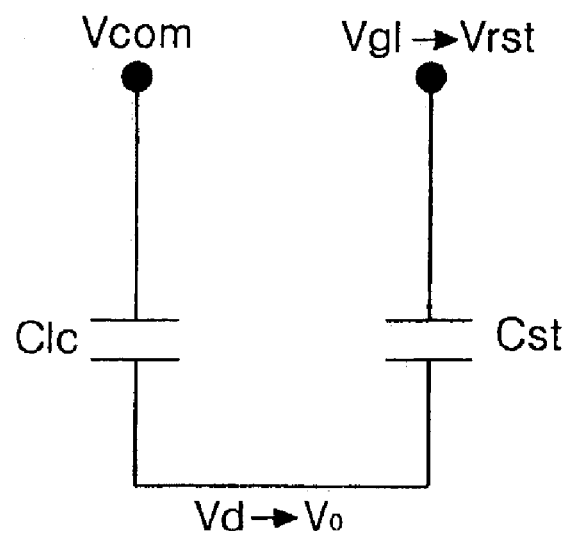
FIG. 9B is a diagram representing a voltage variation when turning off a thin film transistor shown in FIG. 9A.

With reference to FIGS. 9A and 9B, the variation of data voltages in accordance with the variation of gate voltages during the reset period Trst will be explained as follows.

A unit pixel, as shown in FIG. 9A, includes a TFT formed at an intersection part of gate lines GL and data lines DL, a storage capacitor Cst connected to the previous gate line Gn−1, and a liquid crystal cell Clc connected to the TFT, the storage capacitor Cst and a common voltage source Vcom of an upper plate (not shown).

If the gate high voltage Vgh is applied to the $n^{th}$ gate line GLn, the TFT is turned on in response to the gate high voltage Vgh and a data voltage Vd is charged in the liquid crystal cell. If the TFT is turned off, the gate low voltage Vgl is applied to the $(n-1)^{th}$ gate line GLn−1, the previous gate line. The difference between the gate voltage Vd and the gate low voltage Vgl charged in the previous gate line GLn−1 is stored in storage capacitor Cst. During the TFT's turned-off period, the gate reset voltage Vrst is applied to the previous gate line GLn−1 during the reset period Trst before the gate high voltage Vgh of the next frame is applied. As shown in FIG. 9B, the data voltage Vd applied to the liquid crystal cell is changed to the data reset voltage V0 since the gate low voltage Vgl applied to the previous gate line GLn−1 is changed to the gate reset voltage Vrst.

Because the electric charge charged in the liquid crystal cell is maintained, the amount of change ΔV of the data voltage applied to the liquid crystal cell during the reset period is defined as Formula 2.

$$\Delta V_d \Delta V_g C_{st}/(C_{st}+C_{LC})$$ [Formula 2]

wherein, $\Delta V_d$ represents the amount of change of the data voltage at a liquid crystal cell, i.e., the amount of change from the data voltage Vd to the data reset voltage V0, and $V_g$ represents the amount of change of the gate voltage at the previous gate line GLn−1. Cst represents the value of a storage capacitor and Clc represents the value of a capacitor of the liquid crystal.

Based upon Formula 2 above, the data voltage charged in the liquid crystal cell is known to change directly with variation of the gate voltage. Given this relationship, even though the liquid crystals are driven at a voltage lower than an average voltage, if the average voltage Vrms at the liquid crystal cell is more than a transition voltage Vtr, it is possible to prevent the liquid crystals in a bend state from changing to a splay state.

This will be explained as follows in conjunction with FIGS. 10 and 11.

Figure 10:
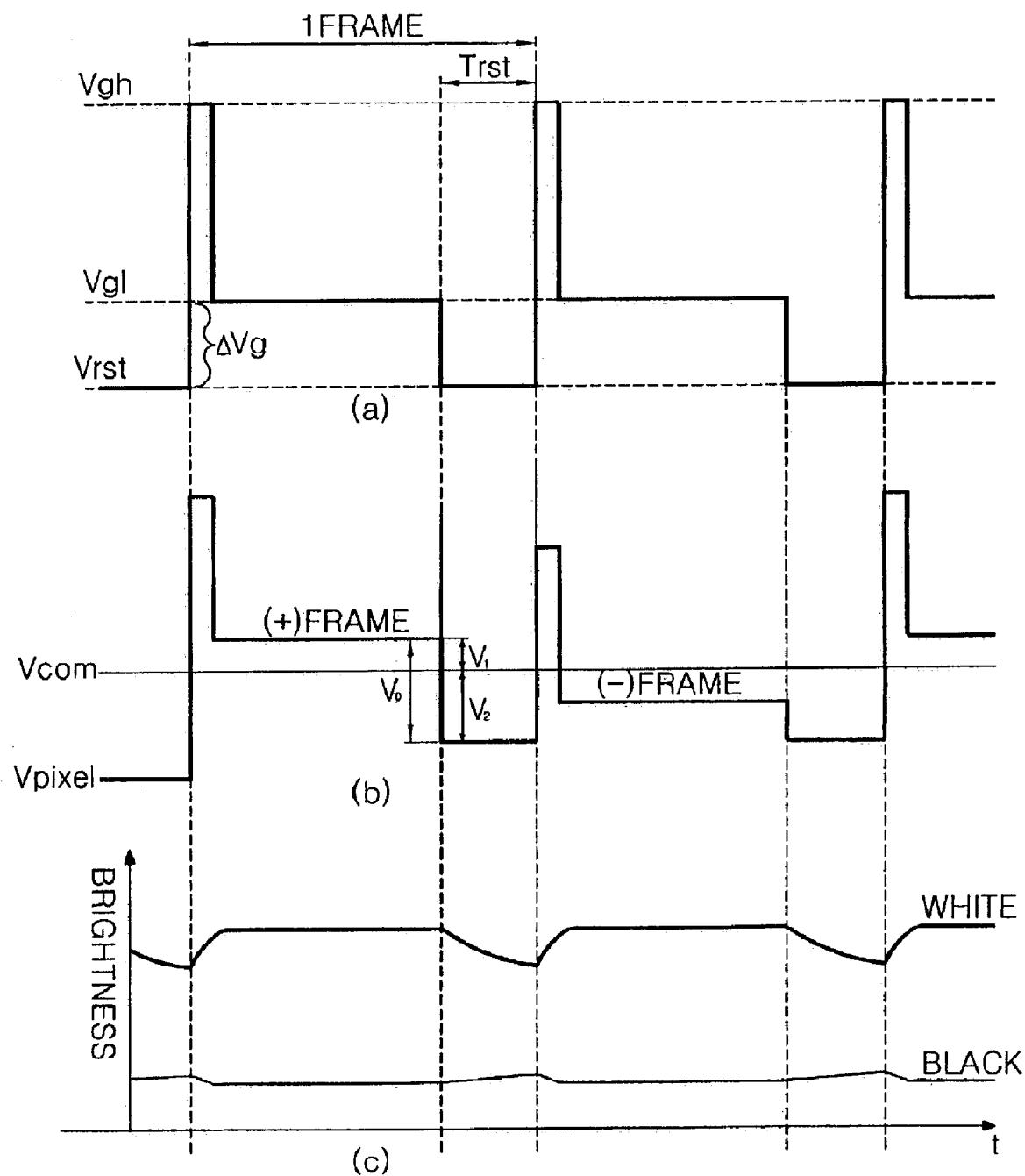
FIG. 10 is a drive waveform diagram and a brightness graph representing a driving method of a liquid crystal display according to a first embodiment of the present invention.
Figure 11:
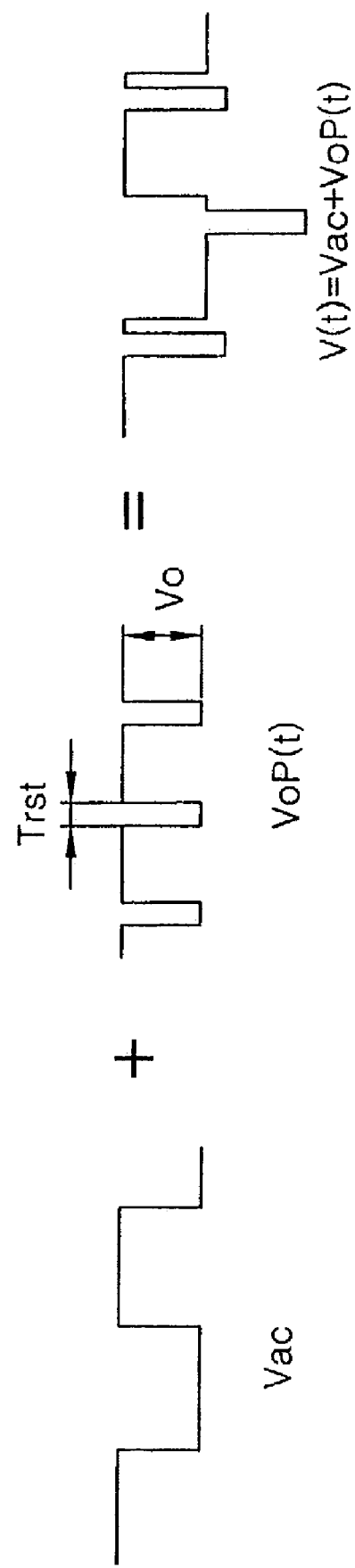
FIG. 11 is a diagram illustrating a data voltage waveform shown in FIG. 10.

A drive waveform diagram shown in FIG. 10 represents variation of a gate voltage (a), a pixel voltage (b) and a brightness (c) for one frame period, which are applied to a liquid crystal display panel driven by a dot inversion scheme.

As shown in FIG. 10(a), the gate reset voltage Vrst is applied to the gate lines during the reset period Trst, and the pixel voltage Vpixel is applied to the liquid crystal cell as indicated by the waveform diagram as in FIG. 10(b).

In the liquid crystal cells on the liquid crystal display panel driven by the dot inversion scheme, each liquid crystal cell is supplied with the data voltage Vd, the polarity of which is opposite to those of the adjacent liquid crystal cells across the gate lines and the adjacent liquid crystal cells across the data lines. In addition, the data voltages Vd applied to all liquid crystal cells on the liquid crystal display panel have polarities inverted.

For example, if a positive (+) data voltage Vd is supplied to the liquid crystal cell in the current frame, a negative (−) data voltage Vd is supplied to the liquid crystal cell in the next frame. Since a negative (−) gate reset voltage Vrst is applied to the gate lines for the reset period Trst in one frame period, a negative (−) data reset voltage V0 is applied to the liquid crystal cell as well. If the negative (−) gate reset voltage Vrst is applied, the variation of the data reset voltage V0 by the gate reset voltage Vrst appears differently in the positive (+) frame and the negative (−) frame in the liquid crystal display panel driven by the dot inversion scheme. In other words, the negative (−) gate reset voltage Vrst increases the average voltage Vrms applied to the liquid crystal cell in the negative (−) frame, whereas it can decrease the average voltage Vrms of the liquid crystal cell in the positive (+) frame. Accordingly, a second voltage V2 should be always higher than a first voltage V1 in the data reset voltage V0 in order not to decrease the average voltage Vrms of the liquid crystal cell in the positive (+) frame, wherein the data reset voltage V0 is the sum of the first and second voltages V1, V2.

An AC voltage Vac may be applied to the liquid crystal cell, and the data reset voltage V0 may be applied in accordance with the gate reset voltage Vrst for the reset period Trst in one frame period. An actual voltage at the liquid crystal cell is obtained by adding the AC voltage Vac to the data reset voltage V0, as in FIG. 11, and to satisfy the following Formula 3.

$$V(t)=V_{ac}+V_0P(t)$$ [Formula 3]

A pixel voltage V(t) applied to the liquid crystal cell in accordance with time is the sum of the AC voltage Vac and the data reset voltage V0 changed in accordance with time. Further, the data reset voltage V0 is the amount of change Δ V of the data voltage for the reset period Trst.

The average voltage Vrms at the liquid crystal cell should be more than the transition voltage Vtr to prevent the transition of liquid crystals from a bend state to a splay state, even though the liquid crystals are driven at a voltage less than the average voltage, which may be defined as in Formula 4.

$$Vtr \leq Vrms = \sqrt{\left(\int_0^{2T} V(t)^2 dt/2T\right)}$$ [Formula 4]

As provided in the above Formula 4, the average voltage Vrms represents the average of voltages applied to the liquid crystal cell for two frame periods 2T. If V(t) of Formula 3 is substituted into Formula 4, the following Formula 5 can be derived.

$$Vac^2+Vac^2+(T_{rst}/T)V_O^2 \geq Vtr^2$$ [Formula 5]

Generally, the AC voltage Vac applied to the liquid crystal cell and the transition voltage Vtr of the liquid crystal are known, and since the average voltage Vrms should be more than the transition voltage Vtr according to Formula 4, the reset time Trst and the data reset voltage V0 can be calculated. At this moment, the data reset voltage V0 depends on the gate reset voltage Vrst changed for the reset period Trst as in Formula 2, thus if the data reset voltage V0 is obtained, the gate reset voltage can be calculated automatically.

If one item of Formula 5 is transposed, Formula 6 is derived.

$$Vac^2 \geq Vtr^2 - (T_{rst}/T)V_O^2 \quad \text{[Formula 6]}$$

In Formula 6, the AC voltage Vac applied to the liquid crystal cell is always higher than a voltage that is lower than the transition voltage Vtr. In other words, when an actual liquid crystal cell is driven, even though the liquid crystal cell is driven at a voltage lower than the transition voltage Vtr, the average voltage Vrms is always higher than the transition voltage Vtr. Thus, the liquid crystals are not changed from a stable bend state to a splay state.

In this way, if the gate reset voltage Vrst is applied to the gate line for the reset period Trst, the liquid crystal according to the present invention can respond for the reset period Trst. A graph of time (t) vs. brightness is as illustrated in FIG. 10(c). Since the liquid crystals respond for the reset period Trst, brightness decreases for the reset period Trst in the liquid crystal display panel of normally-white mode since the liquid crystals respond for the reset period Trst and brightness increases for the reset period Trst in the liquid crystal display panel of normally-black mode. In other words, there is a problem in that brightness is deteriorated for the reset period Trst.

In order to prevent the deteriorated brightness, the reset time Trst can be set smaller than a response time T of the liquid crystals, as in Formula 7.

$$Trst \leq \tau \quad \text{[Formula 7]}$$

As an alternative in a second embodiment, in order to prevent brightness deterioration, the gate line may be supplied with an AC voltage having a smaller half-period than the response time of the liquid crystals for the reset period Trst.

Figure 12:
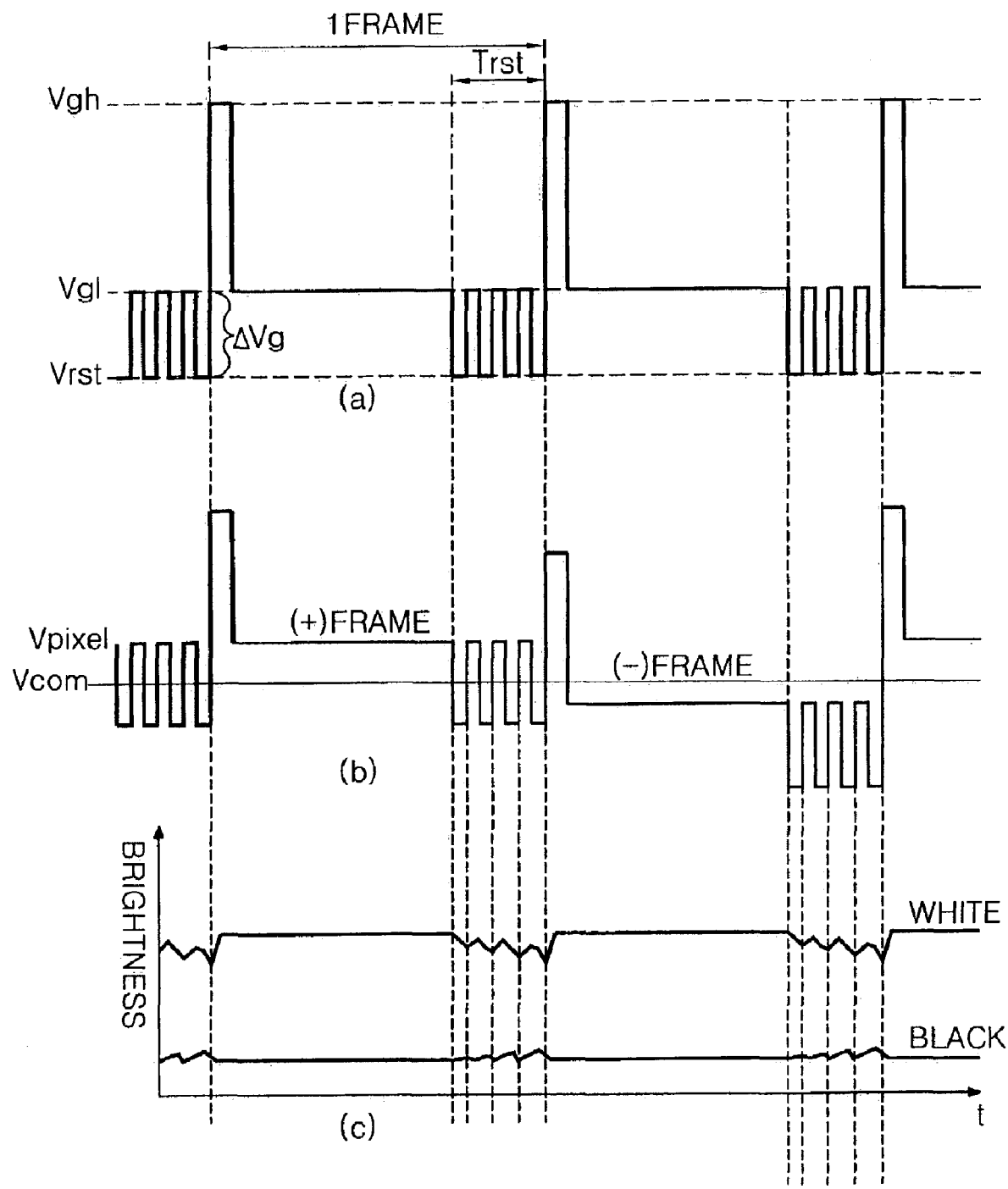
FIG. 12 is a drive waveform diagram and a brightness graph representing a driving method of a liquid crystal display according to a second embodiment of the present invention.

Referring to FIG. 12, a driving method of the liquid crystal display according to the second embodiment of the present invention applies AC pulses of a gate low voltage Vgl and gate reset voltage Vrst to the previous gate line GLn−1 for the reset period Trst. At this moment, the pulse width of the applied AC pulse is set to be more narrow than the response time of the liquid crystals, about 3–5 ms, thereby causing the liquid crystals to not respond.

As a result, a variation width is remarkably reduced in brightness according to time (t) for the reset period Trst in the second embodiment of the present invention, as shown in FIG. 12(c), as compared with the first embodiment. As a result, brightness can be improved more in the liquid crystal display of the second embodiment of the present invention than in the liquid crystal display of the first embodiment.

A pixel voltage Vpixel applied to the liquid crystal cell according to the gate voltage waveform of the second embodiment of the present invention is as in FIG. 12(b). Since the AC voltage and Vrst are applied to the gate line for the reset period Trst, the pixel voltage Vpixel is changed to the AC voltage for the reset period Trst. Since the AC voltage is applied for the reset period Trst in the second embodiment of the present invention in the same way as the first embodiment, the average voltage Vrms at the liquid crystal cell is higher than the transition voltage Vtr. Because a detailed expression is shown in the first embodiment, description thereto will be omitted. If the average voltage Vrms applied to the liquid crystal cell is higher than the transition voltage Vtr, the liquid crystals are not changed from the bend state to the splay state, even though the data voltage applied to the liquid crystal cell is lower than the transition voltage Vtr when the actual liquid crystals are driven. In other words, even though the data voltage applied to the liquid crystal cell is lower than the transition voltage Vtr, the average voltage Vrms is sustained to be higher than the transition voltage Vtr. Thus, the liquid crystals are not changed to a splay state.

The voltage waveform diagram of the second embodiment of the present invention is applied to a driving method of the liquid crystal display panel of dot inversion scheme. Because a negative (−) gate voltage is applied to the gate line for the reset period Trst, a DC component is generated to cause a pixel voltage applied to the liquid crystal cell on the liquid crystal display panel to be biased to the negative polarity (−).

A third embodiment is suggested to prevent a DC component from being generated.

Figure 13:
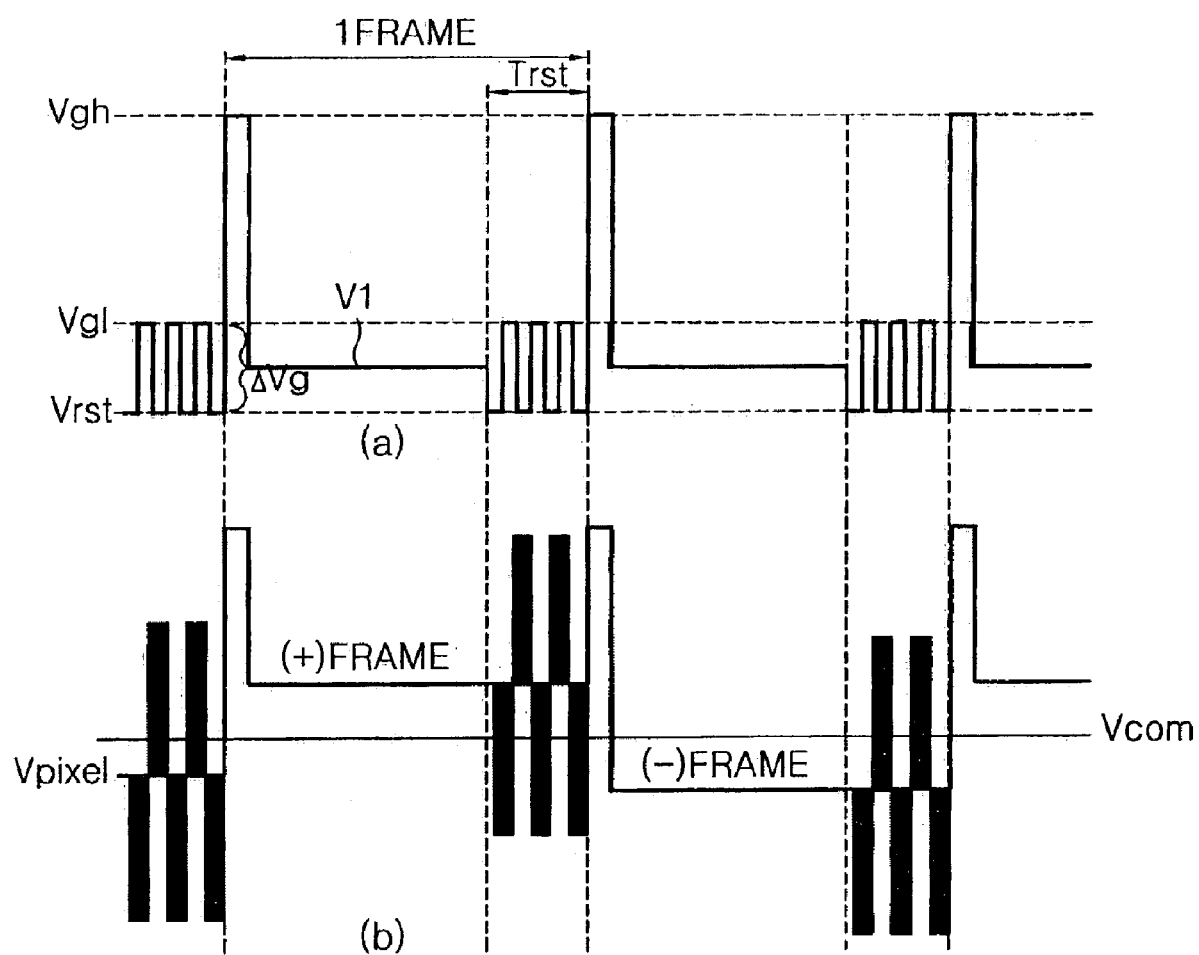
FIG. 13 is a drive waveform diagram representing a driving method of a liquid crystal display according to a third embodiment of the present invention.

Referring to FIG. 13, in a driving method of a liquid crystal display according to a third embodiment of the present invention, the gate low voltage Vgl applied to the previous gate line is reduced to a first gate voltage V1. In addition, the AC voltage of gate reset voltage Vrst and gate low voltage Vgl are applied for the reset period Trst in the same way as the second embodiment.

Positive and negative AC voltages may be applied to the previous gate line GLn−1 on the basis of the first voltage V1, so positive and negative AC voltages are in turn applied to the liquid crystal cell on the basis of a designated data voltage for the reset period Trst, as shown in FIG. 13(b). Accordingly, a DC component is not generated, which causes a pixel voltage applied to the liquid crystal cell to be biased to the positive or negative voltage. The half-period of the AC pulse applied to the liquid crystal cell is set to be smaller than the response time, about 3~5 ms, of the liquid crystals, thereby preventing the liquid crystals from responding.

Since the AC voltage Vrst is applied for the reset period Trst, the average voltage Vrms at the liquid crystal cell is higher than the transition voltage Vtr, in the third embodiment of the present invention in the same way as the second embodiment. Because the detailed expression is shown in the first embodiment, description thereto will be omitted. If the average voltage Vrms applied to the liquid crystal cell is higher than the transition voltage Vtr, the liquid crystals are not changed from the bend state to the splay state even though the data voltage applied to the liquid crystal cell may be lower than the transition voltage Vtr when the actual liquid crystals are driven. In other words, even though the data voltage applied to the liquid crystal cell is lower than the transition voltage Vtr, the average voltage Vrms is sustained to be higher than the transition voltage Vtr. Thus, the liquid crystals are not changed to a splay state.

Figure 14:
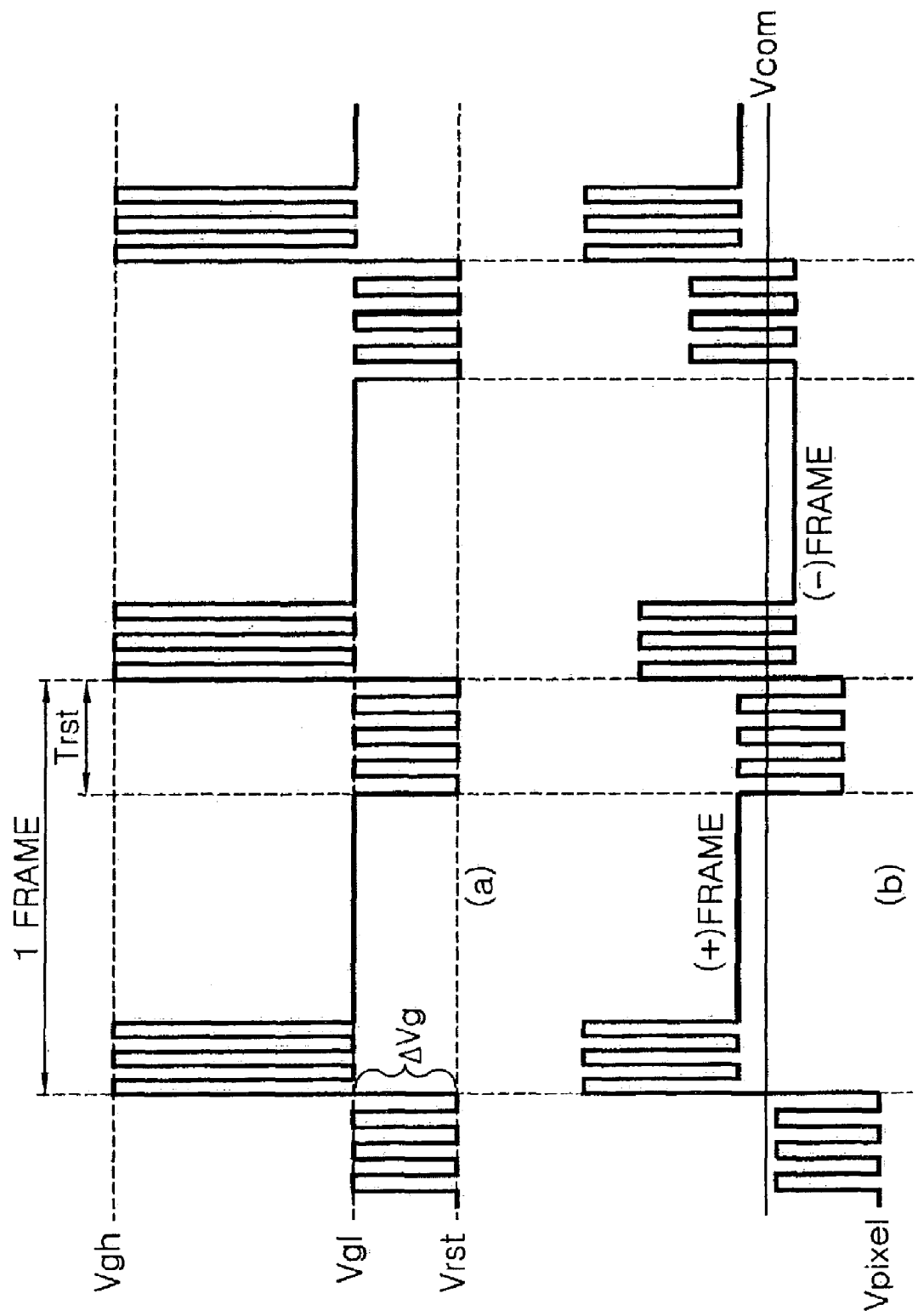
FIG. 14 is a drive waveform diagram representing a driving method of a liquid crystal display according to a fourth embodiment of the present invention.

Referring to FIG. 14, in a driving method of a liquid crystal display according to the fourth embodiment of the present invention, negative AC voltages of gate reset voltage Vrst and gate low voltage Vgl are alternately applied for the reset period Trst in the same way as the second embodiment and, in addition, gate high voltages are sequentially applied to the first through third gate lines to turn on the TFT, thereby supplying positive pixel voltages to the liquid crystal cell.

The fourth embodiment of the present invention is applied to the driving method of the liquid crystal display panel of dot inversion scheme, and because a negative (−) gate voltage is applied to the gate line for the reset period Trst, a DC component is generated to cause a pixel voltage applied to the liquid crystal cell on the liquid crystal display panel to be biased to the negative polarity (−). In order to compensate for this, the gate high voltage Vgh is applied to the three or four gate lines after the reset period Trst to make a positive voltage applied to the liquid crystal cell, thereby compensating for the DC component.

The half-period of the AC pulse applied to the liquid crystal cell is set to be smaller than the response time, 3–5 ms, of the liquid crystals. Thereby, preventing the liquid crystals from responding. Accordingly, deterioration of brightness can be prevented.

Further, since the AC voltage Vrst is applied for the reset period Trst, the average voltage Vrms at the liquid crystal cell is higher than the transition voltage Vtr, in the fourth embodiment of the present invention in the same way as the second embodiment. Because the detailed expression is shown in the first embodiment, description thereto will be omitted. If the average voltage Vrms applied to the liquid crystal cell is higher than the transition voltage Vtr, the liquid crystals are not changed from the bend state to the splay state even though the data voltage applied to the liquid crystal cell is lower than the transition voltage Vtr when the actual liquid crystals are driven. In other words, even though the data voltage applied to the liquid crystal cell is lower than the transition voltage Vtr, the average voltage Vrms is sustained to be higher than the transition voltage Vtr, thus the liquid crystals are not change into the splay state.

Figure 15:
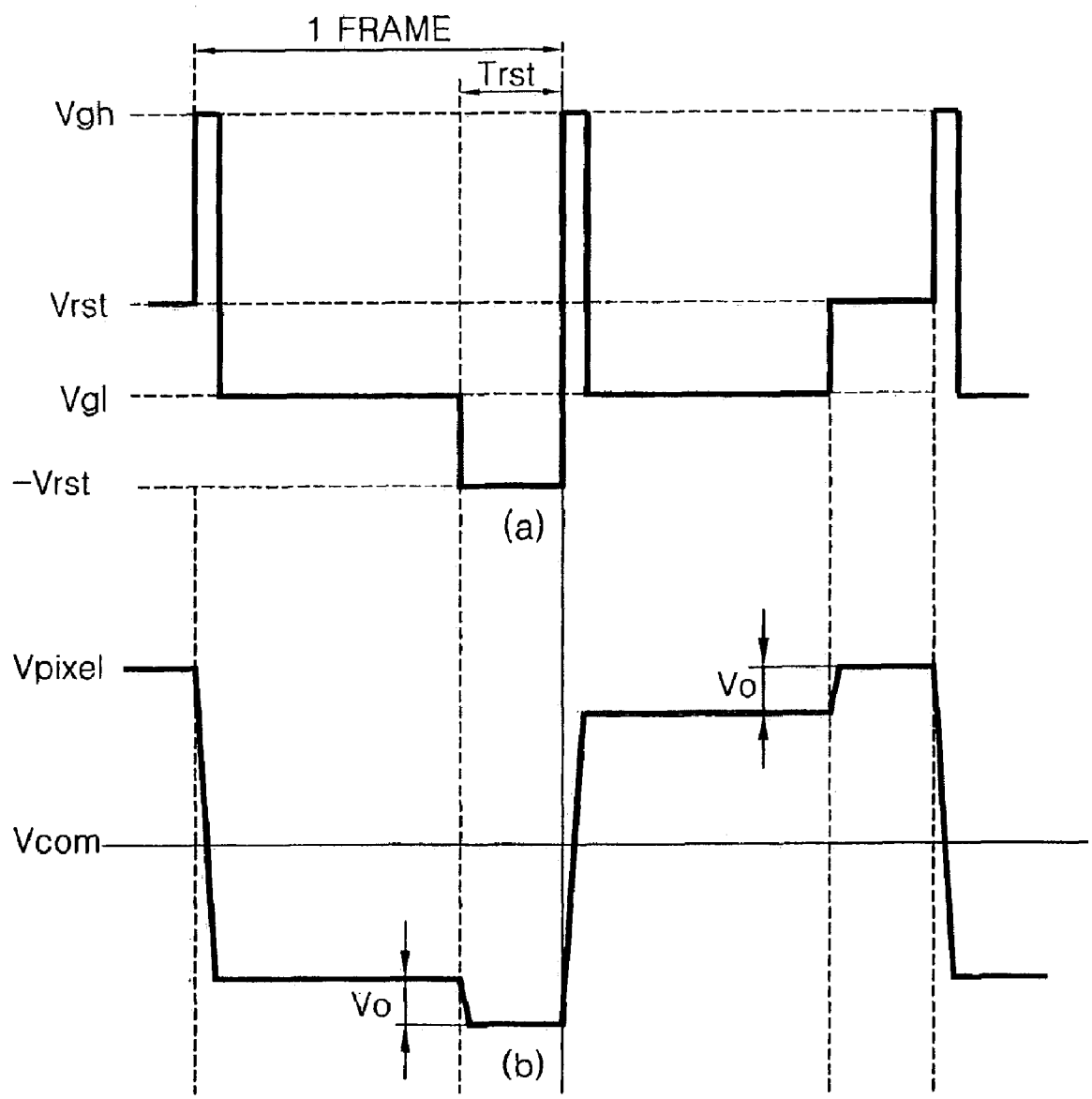
FIG. 15 is a drive waveform diagram representing a driving method of a liquid crystal display according to a fifth embodiment of the present invention.

FIG. 15 is a waveform diagram representing a driving method of a liquid crystal display according to a fifth embodiment of the present invention, which is applied to the liquid crystal display panel driven by a line inversion scheme. Herein, FIG. 15(a) represents a gate voltage waveform diagram, and FIG. 15(b) represents a waveform diagram of a pixel voltage applied to a liquid crystal cell.

The liquid crystal cells on the liquid crystal display panel driven by the line inversion scheme are supplied with a data voltage having a different polarity by lines. In other words, if the positive data voltage Vd is charged in the liquid crystal cells of a horizontal line, the liquid crystal cells of the next gate line are supplied with the negative data voltage Vd. In addition, the liquid crystal cells charged with an arbitrary polarity in the current frame are supplied with the data voltage Vd, the polarity of which is inverted in the next frame.

In an arbitrary liquid crystal cell of a liquid crystal display panel driven by such a line inversion scheme, the gate high voltage Vgh may be applied to the gate lines at the beginning of the current frame, the TFT is turned on, the negative data voltage Vd is charged in the liquid crystal cell, and then when the gate low voltage Vgl is applied, the TFT is turned off to sustain the data voltage Vd charged in the liquid crystal cell. Subsequently, the negative gate reset voltage −Vrst is supplied for the reset period Trst before the gate high voltage Vgh of the next frame is supplied.

In addition, since the liquid crystal cells of the next frame should have polarities inverted, the previous gate lines are supplied with positive gate reset voltage Vrst during the reset period Trst.

The gate reset voltage Vrst is supplied in accordance with the polarity of the data voltage charged in the liquid crystal cells, thus the pixel voltage Vpixel at the liquid crystal cell for the reset period Trst is also charged to be the same as the polarity charged in the liquid crystal cell. Differently from the first embodiment of the present invention, the data reset voltage V0 with the same polarity as the charged liquid crystal cell is supplied for each frame, thereby resulting in the same effect as the data reset voltage V0 supplied to the liquid crystal cells of each frame. Accordingly, the average voltage Vrms supplied to the liquid crystal cell is higher than the transition voltage Vtr, so when actually driving the liquid crystals, the liquid crystals are not changed from the bend state to the splay state, even though the data voltage supplied to the liquid crystal cell is lower than the transition voltage Vtr.

A problem occurs because the liquid crystals respond to the gate reset voltage Vrst of DC voltage supplied for the reset period Trst, thereby deteriorating brightness.

A sixth embodiment is suggested to prevent the deteriorating brightness.

Figure 16:
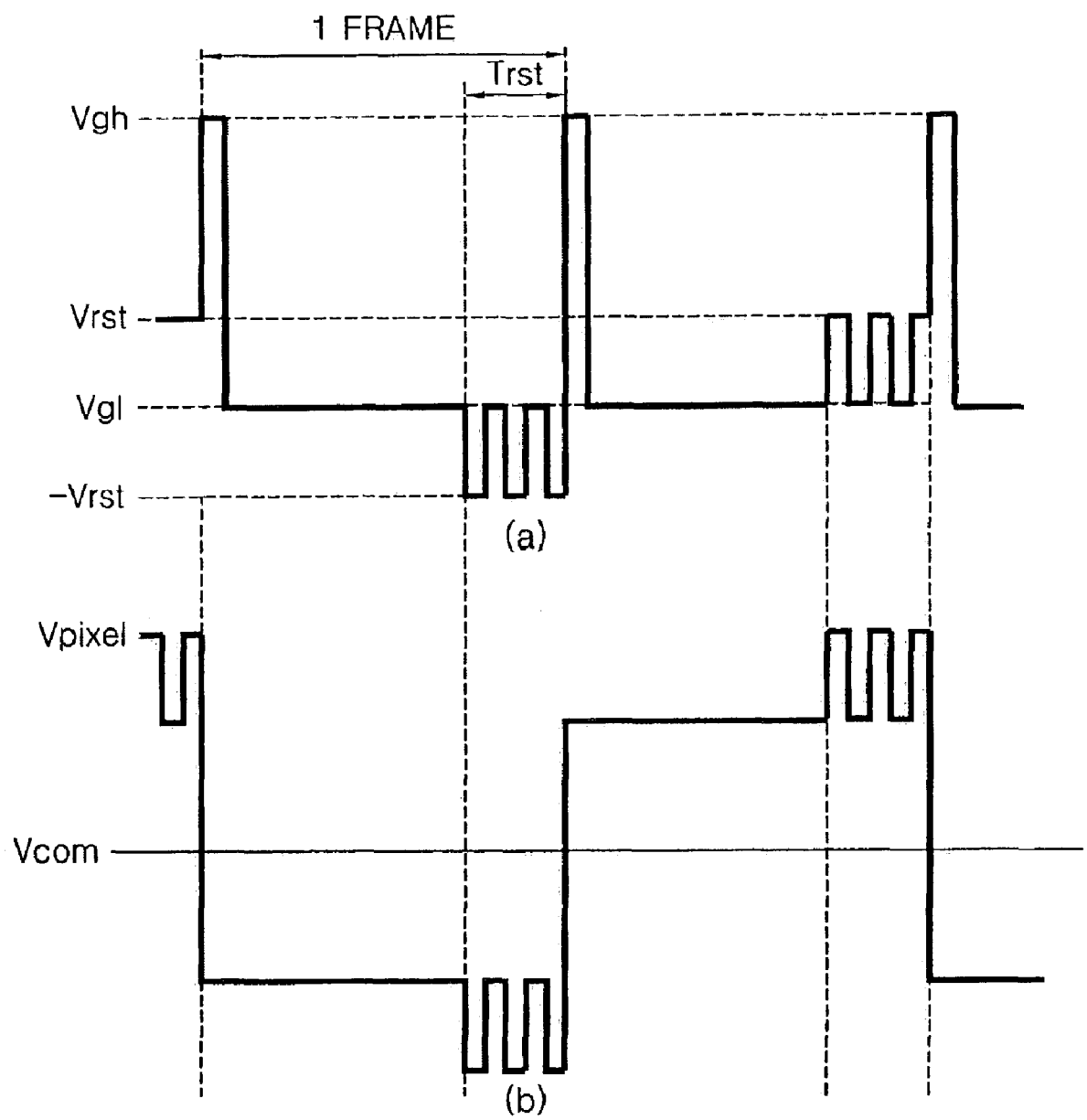
FIG. 16 is a drive waveform diagram representing a driving method of a liquid crystal display according to a sixth embodiment of the present invention.

FIG. 16 is a waveform diagram representing a driving method of a liquid crystal display according to the sixth embodiment of the present invention, which is applied to the liquid crystal display panel driven by a line inversion scheme. Herein, FIG. 16(a) represents a gate voltage waveform diagram, and FIG. 16(b) represents a waveform diagram of a pixel voltage applied to a liquid crystal cell.

In an arbitrary liquid crystal cell of a liquid crystal display panel driven by such a line inversion scheme, the gate high voltage Vgh is applied to the gate lines at the beginning of the current frame, the TFT is turned on, the negative data voltage Vd is charged in the liquid crystal cell, and then when the gate low voltage Vgl is applied, the TFT is turned off to sustain the data voltage Vd charged in the liquid crystal cell. Subsequently, the gate low voltage Vgl and the negative gate reset voltage −Vrst are alternately supplied for the reset period Trst before the gate high voltage Vgh of the next frame is supplied. At this moment, the half period of AC voltage is set to be smaller than the response time of liquid crystals.

In addition, since the liquid crystal cells of the next frame should have polarities inverted, the previous gate lines are alternately supplied with the positive gate reset voltage Vrst and gate low voltage Vgl for the reset period Trst.

The gate reset voltage Vrst is supplied in accordance with the polarity of the data voltage charged in the liquid crystal cells, thus the pixel voltage Vpixel at the liquid crystal cell for the reset period Trst is also charged to be the same as the polarity charged in the liquid crystal cell. Differently from the first embodiment of the present invention, the data reset voltage V0 with the same polarity as the charged liquid crystal cell is supplied for each frame, thereby resulting in the same effect as the data reset voltage V0 supplied to the liquid crystal cells of each frame. Accordingly, the average voltage Vrms supplied to the liquid crystal cell is higher than the transition voltage Vtr, so when actually driving the liquid crystals, the liquid crystals are not changed from the bend state to the splay state even though the data voltage supplied to the liquid crystal cell is lower than the transition voltage Vtr.

Additionally, the gate lines are supplied with the AC voltage having a narrower pulse width than the response time of the liquid crystals for the reset period Trst, so that deterioration of brightness can be prevented.

Figure 17:
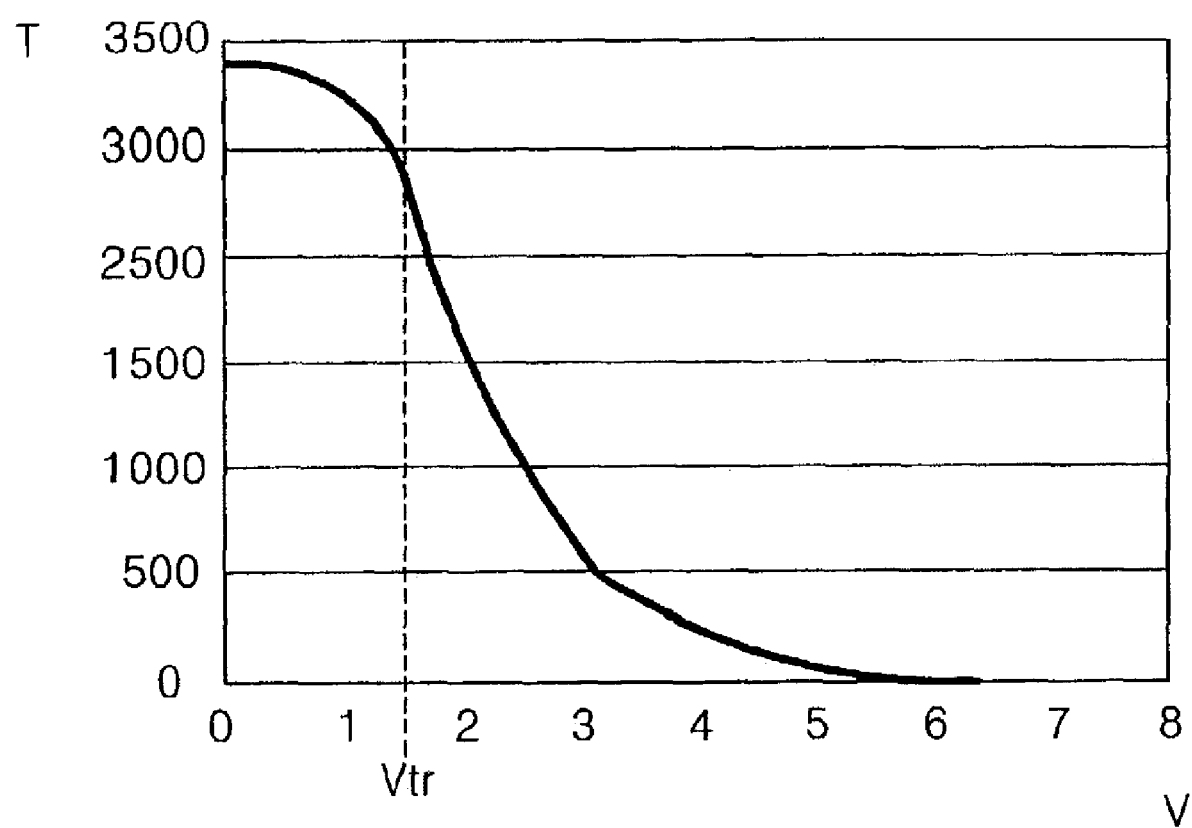
FIG. 17 is a graph representing a plot of transmittance versus voltage according to a driving method of the liquid crystal display of the present invention.

In the driving method of the liquid crystal display according to the present invention, the transmittance T in accordance with the voltage V of the liquid crystal cell of OCB mode cannot be observed to drop rapidly, as shown in FIG. 17, because the liquid crystals are not changed back to the splay state even though it is driven at a voltage lower than the transition voltage Vtr while driven normally, wherein the voltage is not much different from the transition voltage Vtr.

As described above, in the liquid crystal display and the driving method thereof according to the present invention, the gate reset voltage Vrst is supplied to the gate lines in response to the reset signal from the reset signal generator for the reset period Trst of the TFT's turned-off period. In the liquid crystal display and the driving method thereof according to the present invention, since the data voltage is also changed during the reset period in accordance with variation of the gate voltage, the average voltage Vrms of the pixel voltage applied to the liquid crystal cell is more than the transition voltage Vtr. Accordingly, in the liquid crystal display and the driving method thereof according to the present invention, the liquid crystals cannot be changed from the bend state to the splay state because the average voltage of the liquid crystal cell Vrms is maintained to be higher than the transition voltage Vtr even though the external impact is applied to the liquid crystal cell when the liquid crystal cell is actually driven at the data voltage applied to the liquid crystal cell, which is lower than the transition voltage Vtr.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
   a liquid crystal display panel having a thin film transistor at each crossing of a plurality of data lines and a plurality of gate lines;
   a gate driver configured to supply a gate high voltage and a gate low voltage during a data input period, and sequentially supply an AC voltage that pulses between the gate low voltage and a gate reset voltage to the gate lines during a reset period, wherein a normal drive period is divided into the data input period and the reset period, and wherein an average voltage applied to a pixel over the normal period is greater than a transition voltage corresponding to a splay state;
   a data driver configured to supply data voltages to the data lines in accordance with gate voltages applied to the gate lines; and
   a timing controller configured to control the data voltages supplied to the data lines and the gate voltages supplied to the gate lines.

2. The liquid crystal display according to claim 1, wherein the gate driver is configured to supply the gate high voltage to the gate lines during an on-period for the thin film transistor in the data input period, and to supply the gate low voltage to the gate lines during an off-period for the thin film transistor.

3. The liquid crystal display according to claim 1, wherein the gate reset voltage is a designated voltage set to be lower than the gate low voltage.

4. The liquid crystal display according to claim 1, wherein the AC voltage is alternately applied to a previous gate line.

5. The liquid crystal display according to claim 1, wherein a half period of the AC voltage is set to be less than a response time of the liquid crystals.

6. The liquid crystal display according to claim 1, wherein the gate low voltage applied for the data input period is the same as an average value of the AC voltage.

7. The liquid crystal display according to claim 1, wherein the gate high voltage is applied at least two times for the data input period.

8. The liquid crystal display according to claim 1, wherein the gate reset voltage is an AC voltage having positive and negative polarities alternated on the basis of the gate low voltage for each frame.

9. A driving method of a liquid crystal display, comprising:
   dividing a normal drive period into a data input period and a reset period;
   supplying a gate high voltage and a gate low voltage to the gate lines for the data input period;
   supplying an AC voltage that pulses between the gate low voltage and a gate reset voltage to the gate lines to make an average voltage of liquid crystal cells higher than a transition voltage corresponding to a splay state for the reset period; and
   supplying a data reset voltage to the data lines in accordance with the gate reset voltage.

10. The driving method according to claim 9, wherein supplying the gate high and gate low voltages includes supplying the gate high voltage to the gate lines during an on-period for a thin film transistor, and supplying the gate low voltage to the gate lines during an off-period for the thin film transistor.

11. The driving method according to claim 9, wherein the gate reset voltage is a designated voltage set to be lower than the gate low voltage.

12. The driving method according to claim 9, wherein a half period of the AC voltage is set to be less than a response time of the liquid crystals.

13. The driving method according to claim 9, wherein the gate low voltage applied for the data input period is the same as an average value of the AC voltage.

14. The driving method according to claim 9, wherein the gate high voltage is applied at least two times for the data input period.

15. The driving method according to claim 9, wherein the gate reset voltage is an AC voltage having positive and negative polarities alternated on the basis of the gate low voltage for each frame.

* * * * *